Jan. 12, 1954
C. FUMAGALLI
2,666,149
ELECTRIC GENERATOR WITH VARIABLE PROPELLER
AND GOVERNING MEANS THEREFOR
Filed May 1, 1947
2 Sheets-Sheet 1
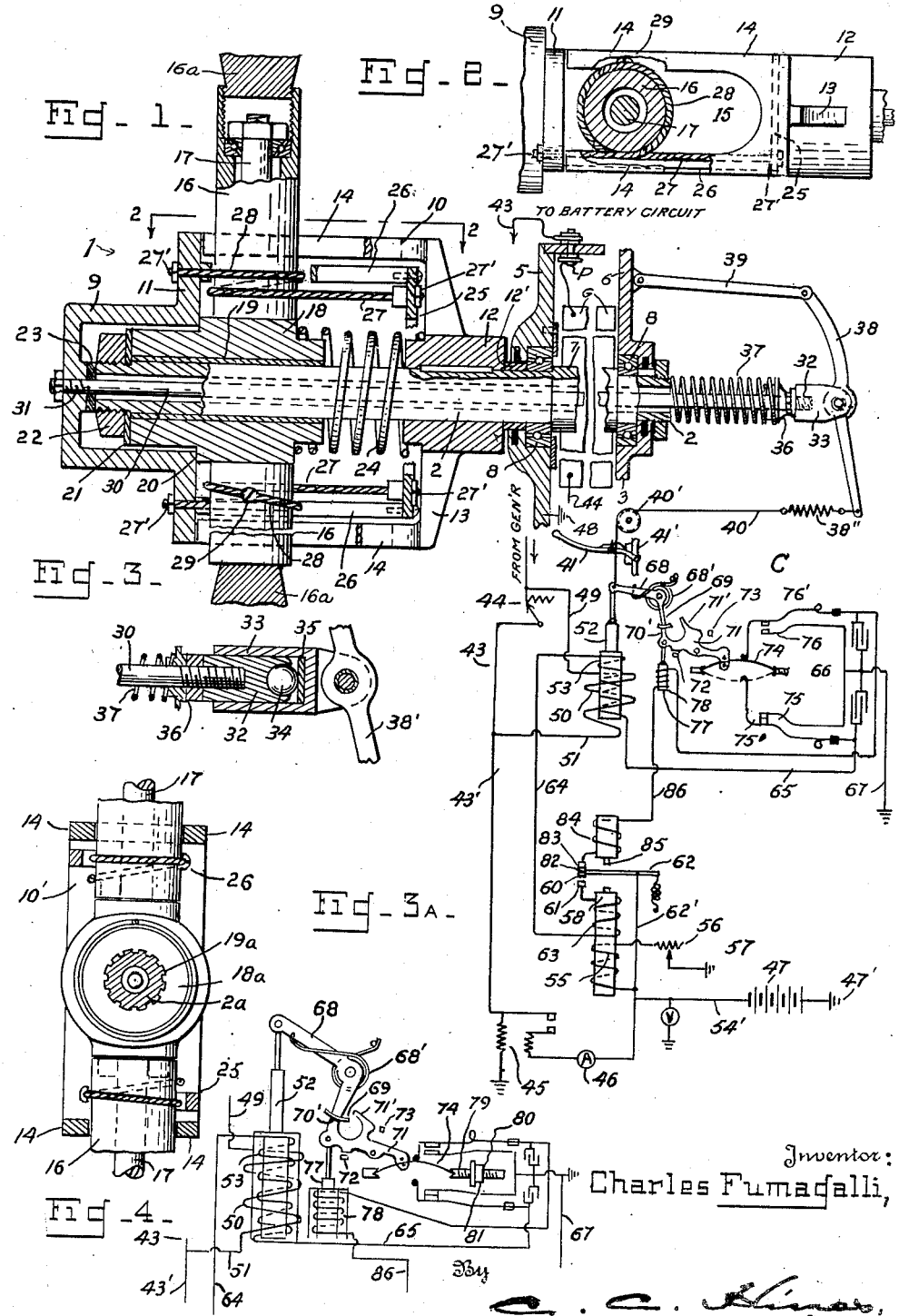
Inventor:
Charles Fumagalli,
Attorney.

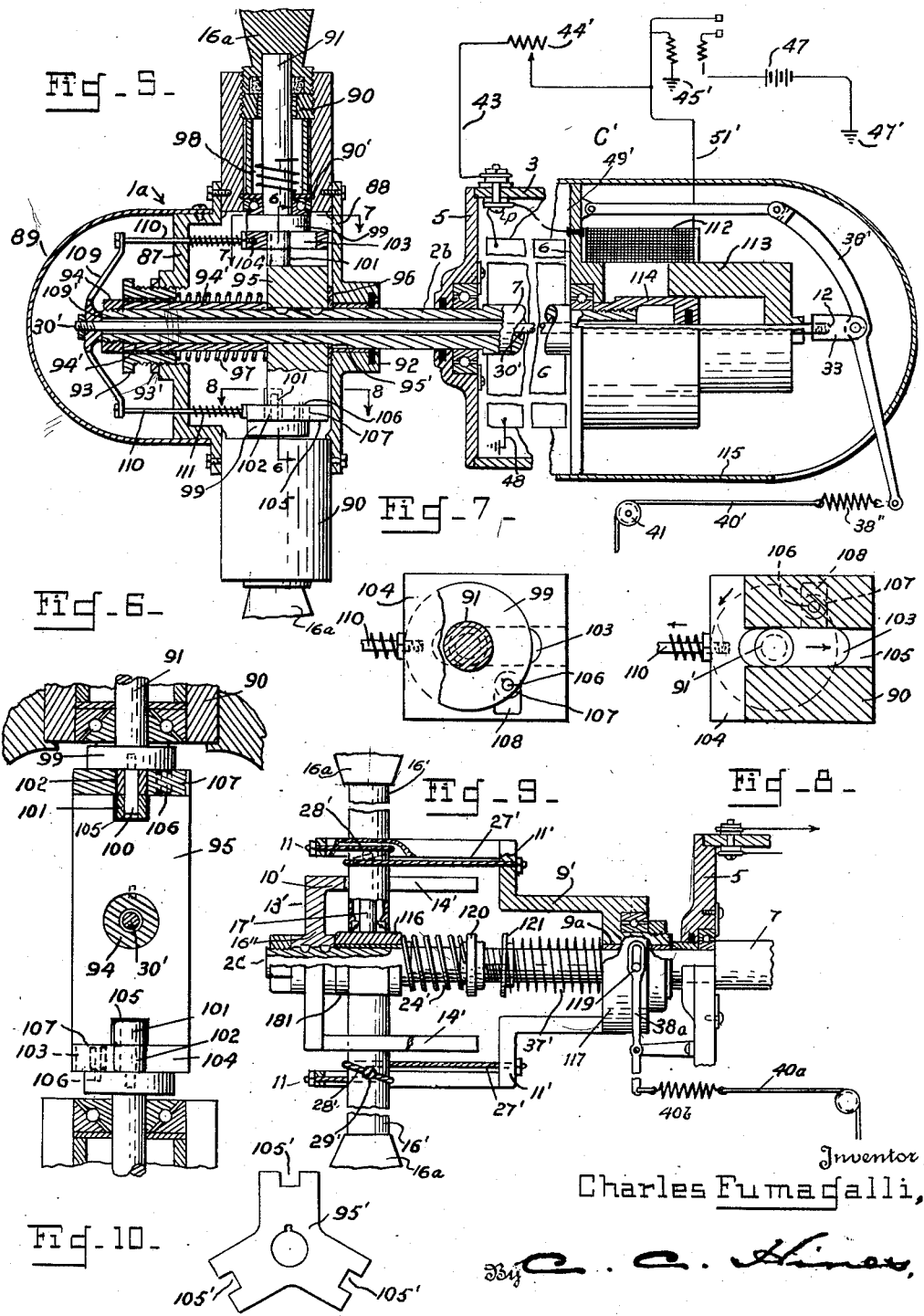

Patented Jan. 12, 1954

2,666,149

UNITED STATES PATENT OFFICE 2,666,149

ELECTRIC GENERATOR WITH VARIABLE PROPELLER AND GOVERNING MEANS THEREFOR

Charles Fumagalli, Guatemala City, Guatemala

Application May 1, 1947, Serial No. 745,211

32 Claims. (Cl. 290—44)

This invention relates to air propellers of that type having blades adjustable to vary their pitch, and to controlling means for adjusting the blades to vary their pitch and regulate the speed of the propeller to any desirable speed or to stop the propeller as required to meet service conditions. The invention particularly relates to a high speed variable pitch propeller which is adapted for general use as a power producing or driving agent, and which embodies novel controlling means for varying its pitch and speed, but which, while not limited in use thereto, is especially designed and adapted for use as a wind-driven propeller for operating a windmill mechanism, for driving any other kind of mechanism or for driving an electric generator for charging an electric supply and storage system to furnish current for electric lighting and/or power purposes.

One object of the present invention is to provide a novel construction of high speed propeller having adjustable blades and novel means governed by wind pressures for changing the propeller pitch and regulating the speed of the propeller proportionately to the speed of the wind to secure safe operation of the propeller at a predetermined top speed under any normal and even high wind speeds.

Another object of the invention is to provide a variable pitch propeller having a simple construction of controlling means which is normally of automatic type in action under wind pressures, but which may be manually controlled if desired by means which may also be employed to throw it into and out of action.

Still another object of the invention is to provide a propeller which may be employed to drive an electric generator for supplying current to an electric supply and storage system, and in which its blade adjusting and controlling means may be electrically controlled to vary and regulate its speed to vary the charging rate of the generator as necessary to meet battery requirements or other conditions in the electric circuit to keep the storage battery charged and to prevent its overcharge.

Still another object of the invention is to provide a novel construction of adjusting means and transmission means for adjusting the propeller blades and transmitting motion from the propeller, and to provide means for manually or electrically setting the propeller to run at different top speeds for increasing or decreasing the charging rate of the generator according to the requirements of the battery and circuit, and to stop and start the propeller to prevent injury thereto or damage to the parts of the electrical system, as service conditions may require.

With these and other objects in view, which will appear in the course of the subjoined description, the invention consists of the novel features of construction, combination and arrangement of parts, hereinafter described and claimed, and as shown in the accompanying drawings, in which:

Figure 1 is a fragmentary vertical longitudinal sectional view of parts of a propeller structure embodying my invention, showing the parts in normal or starting position, and also showing parts of the casing of an electric generator and parts of an electrical circuit adapted to be charged by the generator, which casing may serve as a windmill head support in the employment of the parts in a windmill structure.

Figure 2 is a sectional plan view take on line 2—2 of Figure 1.

Figure 3 is a detail section of the coupling bearing between the control rod and the control lever.

Figure 3a is an enlarged detail view of a portion of the electric circuit.

Figure 4 is a vertical section through the propeller hub, shaft and control rod and showing a modified form of connection between the propeller shaft and its bearing hub.

Figure 5 is a view generally similar to Figure 1 showing a modified construction of the propeller and its mechanical and electrical control means.

Figure 6 is a vertical transverse section on an enlarged scale taken substantially on line 6—6 of Figure 5, showing the propeller hub block and crank connections between the same and the propeller shafts.

Figures 7 and 8 are detail sections taken respectively on lines 7—7 and 8—8 of Figure 5.

Figure 9 is a fragmentary sectional view showing still another modified form of propeller and blade adjusting and propeller speed controlling means.

Figure 10 is a view of a form of hub block for use when a three bladed type of propeller is employed.

The present invention provides certain improvements upon the structures shown in my prior applications, Serial No. 715,552, filed December 11, 1946, now Patent No. 2,547,636, issued April 3, 1951, and Serial No. 716,588, filed December 16, 1946, differing therefrom in the construction of the propeller speed controlling means and transmission for transmitting driving motion from the propeller, the present invention being designed to provide a simplified construction of means for these purposes.

Referring now more particularly to Figures 1 and 2 of the drawings, showing one form of embodiment of my invention, 1 represents the propeller structure proper which is mounted on a hollow, horizontally arranged transmission shaft 2, and 3 represents a suitable support for the propeller and shaft whereby, in the use of the propeller on a windmill, the propeller and support may be mounted for rotation in the usual manner on a windmill tower so that the propeller may turn into and out of the path of the wind. The support 3 is arranged in rear of the propeller structure and is shown in the present instance fragmentarily in the form of a casing including a body 4 and front and rear walls 5 and 6. This casing may enclose power producing or transmitting means of any suitable character. In the present instance, it is designed to represent the casing of an electric generator, generally indicated at G, which is driven by the propeller to supply current to an electric circuit C. The generator armature in practice is mounted in the casing on the portion 7 of the rear end of the shaft 2, which passes through and is secured against longitudinal movement to the walls 5 and 6 but is rotatable freely in antifriction bearings 8 carried by said walls.

The propeller proper comprises an outer enclosing casing, frame or hub consisting of a front cup-shaped or chambered adjusting member 9 and a rear guiding and driving member 10. The member 9 is closed at its forward end and open and formed with a flange 11 at its rear end. The member 10 is in the form of a yoke consisting of a collar 12 keyed to the shaft 2 to rotate therewith but held against sliding movement thereon, to which collar are fixed radial flanges 13 carrying a pair of forwardly projecting arms 14 lying on opposite sides of the shaft and with their forward ends terminating adjacent to the flanges 11 of the member 9.

The arms 14 are provided with longitudinal slots 15 through which project hollow stub shafts 16 to which the blades B of the propeller are fastened. These shafts 16 are carried by spindles 17 and are movable longitudinally in the slots 15 and rotatable about the spindles for blade adjusting purposes, as hereinafter described. The spindles 17 are fixed to a block or inner hub 18 bushed, as shown at 19, to the portion of the shaft 2 enclosed by the parts 9 and 10 so as to adapt it to slide on the shaft between the member 9 and collar 12 of member 10. The forward end of this block 18 is movable in the chamber of part 9 and is limited in its forward movement therein by a stop shoulder 20 and in its forward movement on the shaft by a washer 21 and nut 22. A bumper 23 of suitable material on the rear wall of member 9 or front end of the shaft 2 cushions the rearward movement of member 9 to prevent it from slamming against the nut 22 and shoulder 20, and this bumper serves in connection with the nut 22 and washer 21 as a spacing means to preclude contact of flange 11 and arms 14.

The block or inner hub 18 and blade supporting spindles and shafts carried thereby are slidable rearwardly on the shaft 2 against the yielding resistance of a coiled spring 24 encompassing the shaft between said block 18 and the sleeve 12. The spacer sleeve 12' is placed in between the front bearing 8 of the generator housing and the sleeve 12 to prevent said sleeve from rubbing against the generator housing wall 5. This spring normally holds the block 18 in the position shown in Figure 1 in which the shafts 16 are disposed at the forward ends of the guide slots 15 in the arms 14. When the parts above described are in this normal position the blades 16a carried by the shafts 16 are disposed in their normal starting and high speed running position, which may be at any desired high speed pitch angle. The block 18, spindles 17 and shafts 16, constituting with the blades 16a the propeller per se, when rotated by the pressure of the wind, transmit the driving force through the driving or transmission member 10 to the shaft 2. The propeller per se is shiftable rearwardly on the shaft 2 and in the slots 15 of the driver, against the resistance of the spring 24, under increasing wind pressures for pitch changes of the blades, by pitch changing means, to reduce the angle of attack of the blades in proportionate relation to the wind forces to drive the shaft 2 at a high but safe and substantially constant speed of a predetermined R. P. M. at all wind pressures up to any high wind speed. The propeller per se is movable forwardly by the spring 24 from any of the rearward positions to which it has been moved by wind pressures as the wind pressures relatively decrease from any higher to any relatively lower pressure, to adapt the blades to be turned backward through proper degrees toward starting and running position by the pitch changing means to increase their angle of attack to keep the shaft rotating at the desired substantially uniform speed. As the wind pressures vary from low to high and high to low such pressures and the opposing pressure of the spring 24 will cause the blades to be rotated about their spindles in one direction or the other to keep the shaft rotating at the substantially constant speed through the action of the pitch changing means, which I will now proceed to describe.

Arranged within the space bounded by the members 9 and 10 is a blade adjusting motion transmitting means comprising an anchor plate and follower member 25 normally arranged adjacent to the sleeve 12 and apertured so as to receive and to be centered about the forward end of said sleeve. This member 25 is connected by spacing bars or arms 26 to the flange 11 of member 9 so as to be maintained at a fixed distance from the member 9 and to be movable with the member 9 forward and back again to normal position when the member 9 is moved. Extending between the members 9 and 25 are cables 27 which are fastened at their ends 27' thereto and which are provided intermediate of their ends with spring-like coils 28 wound in opposite directions about the respective shafts and secured thereto by fastenings 29. The arrangement of these cables and their coils is such that when the propeller per se is shifted in one direction or the other by wind forces or by the action of the spring 24, the propeller blades, through the winding and unwinding actions of the coils, will be adjusted to different angles in an obvious manner to govern the propeller to work at a constant R. P. M. instead of at a speed proportionate to the speed of the wind so as to drive the shaft 2 at a substantially uniform speed.

It will be understood from the foregoing that any sliding movement of the block or hub member 18 backwardly from its normal position changes the pitch of the propeller blades to a higher pitch angle to decrease the propeller speed in proportion to the extent of its rearward movement, and vice versa, as, when the block 18 rapidly moves forwardly from a backward position under the action of spring 24 and the suction created by the inertia of the revolving propeller at decreased lower wind speeds, the blades will be adjusted to a lower pitch angle to increase the propeller speed. In other words, the propeller constantly gears itself to different wind speeds by quick pitch changes to maintain a constant speed R. P. M. regardless of the variation of the wind speeds and pressures.

The members 9 and 25 are normally maintained in a fixed position against sliding movement, but are adapted to be moved by manually or automatically operated means forwardly from the normal position shown in Figure 1 to shift the blades to an abnormally low speed pitch angle position or a stopping position. The means employed for this purpose comprises a rod 30 fixed at its forward end to the member 9, as at 31, and extending therefrom through the shaft 2 to and beyond the rear wall 6 of the generator casing 3. This rod is threaded and secured locked at its rear end to a bearing head 32 rotatable in a coupling sleeve-bracket 33 and in contact with a bearing ball 34 and liner 35. Fitted on this end of the shaft is a threaded adjustable abutment member 36, and disposed about the shaft between the abutment and the rear end of the shaft 2 is a coiled spring 37 exerting pressure on and through the rod to hold the members 9 and 25 in normal position and yieldingly against longitudinal forward movement. Fulcrumed intermediately to the bracket 33 is a lever 38 having an upper arm attached by a link 39 to the wall 6 and having a lower arm to which is attached a control cable 40 leading forwardly over a pulley 40' and attached to a hand lever 41. By operating this lever to draw the cable downward, rod 30 may be moved forwardly from its normal position against the resistance of spring 37, carrying with it members 9 and 25, whereby the cables 27 will be operated to rotatably adjust the propeller blades from their normal position in the same manner as the adjustment obtained by wind pressures and action of the spring 24, to reduce the speed of the propeller or to throw it out of action by feathering the blades, as will be readily understood. When the hand lever is released the spring 37 will return the parts 9, 25, 27 to normal starting and high speed position.

When a generator is used the rotation of the shaft 2 drives the generator at the predetermined propeller speed and correlated charging rate. If a manual means, such as the hand lever 41, is alone employed to adjust the governing rod, this hand lever may be manipulated to control the action of the propeller and generator to reduce the charging rate as required or to throw the propeller and generator out of action when the battery is fully charged or reduction in the rate of or stoppage of generation is required from any cause. The lever may be provided with a dog 41' to engage a stationary rack to lock the lever or not in stopping and controlling positions when desired. I, however, also show means in the circuit C for automatically performing these control functions, which means may accord substantially with that disclosed in my aforesaid application, Serial No. 716,583, and may be briefly described as follows:

In the circuit C is a storage and supply battery 47 supplied with current by the generator, the current travelling from generator positive terminal P by lead 43, about the variable resistance 44, through the cut-out relay 45, ammeter 46 through the battery 47 and through ground terminal 47' or a conductor (not shown) back to generator negative 48. If the battery is in a low state of charge the full generator output may be utilized to charge said battery, but by switching in the resistance 44 more or less the current may be diverted and caused to pass through the conductor 49, solenoid coil 50, conductor 51 and through the conductor 43' to the battery 47. As the circuit of this solenoid is connected in parallel with the resistance 44 the coil 50 is inactive during the flow of current through conductor 43 when the resistance is switched off, but when the resistance is switched on in series with the battery the current is forced to travel more or less through the coil 50. When this coil is energized by the flow of current through it, the solenoid armature 52 which is connected to cable 40 is attracted, thus drawing on the cable to actuate lever 38 to more or less compress the spring 37 and force the rod 30 forward. This action slides members 9 and 25 as a unit forward, thereby actuating cables 27 to turn the blades to an angular position to reduce the speed of the propeller and the output of the generator to charge the battery with a decreased amount of current. As the amount of current passing through the coil 50, due to the setting of the resistance 44, regulates the strength of the coil and extent of downward movement of the armature or release for upward movement, augmenting or diminishing the pulling or relaxing action of the armature and the cable 40, the automatic control mechanism above described will govern the speed of the propeller to drive the generator at the desired and even charging rate. Any adjustment varying the value of the resistance 44 causes the propeller R. P. M. and the generating rate to be cooperatively and calibratively varied to generally maintain a predetermined charging rate regardless of wind speeds.

Armature 52 is also adapted to be attracted by a starting and stopping coil 53 to throw the propeller out of action when the battery is fully charged and to throw it into action when the state of the battery warrants a resumption of the charging action. From the positive of the battery a wire 54' takes voltage to energize a coil 55 and from said coil through a variable resistance 56 and ground 57 back to battery negative 47'. When the voltage of the battery reaches its full charge condition, governed by previous adjustment of variable resistance 56, the magnetic force of coil 55 on its core 58 is increased to attract the spring released magnetic armature 62, closing the circuit at contact points 60, 61, so that through the conductors 54' and 62' a certain amount of amperage will flow from the positive of the battery through conductor 62', armature 62, contacts 60, 61 and heavy coil 63, which is energized to exert a stronger magnetic pull on armature 62 holding contact points 60, 61 tight and preventing heating and sparking at said contact points, the current continuing its travel through conductor 64 to solenoid coil 53 and by lead 65 to insulated break and make switch 66 and through contacts 75' and 75, grounded switch conductor 67 back to battery negative 47'. The current passing through the solenoid coil 53 magnetically attracts its armature 52, which is coupled to one end of a pivoted bell crank lever 68 connected to the cable 40. Lever 68 is provided at its other end with a projection 69 adapted to be engaged by the hooked end 70' of a pivoted latch 71 movable between stops 72 and 73 and pivotally connected at its opposite end to a bowable spring 74, which in its upward and downward bending movements alternately makes and breaks the contacts 75' and 76' of two opposed switches 75 and 76. The latch member 71 is connected to the movable core 77 of a solenoid including coil 78, which when energized pulls said core 77 downwardly to move the latch from an engaging position to its releasing position illustrated. The hooked end of the latch 71 provides a locking projection 70' and a trip arm or projection 71'. The drawing shows the parts of the cable locking and releasing means in released position in which member 68 is drawn upward by its release spring 68'.

The action of the speed control coil 50 on core 52 to electrically govern the speed of the propeller has been heretofore described, and I will now proceed to describe the action of the stronger stopping coil 53 on the core 52 to stop the propeller and lock it in stopped position, as well as the propeller releasing and automatic stopping operation.

When at a proper time the solenoid coil 53 is energized the core 52 is drawn down and operates member 68 to pull down on cable 40 and move parts 30, 9 and 25 forward to a maximum degree to stop the propeller. In this operation the latch arm of member 68 strikes projection 71' to move latch 71 against stop 73 and tilt latch 71 to pull the core 77 upward, bringing latch projection 70' above and in engagement with projection 69 to lock the cable 40 in propeller stopping position and also bowing spring 74 downward which closes contacts 76' of switch 76 and breaks the contacts 75' of switch 75, thus deenergizing coil 53 and preparing the circuit to energize coil 78 for a starting operation when demanded by the circuit voltage conditions. As the spring 74 is held between the keeper notches of a fixed keeper 79 and a threaded and adjustable keeper screw 80 and locknut 81, said spring 74 when being forced to bow downwards or upwards will be given a certain tension to hold either switch in a switch-off position and acts incidentally as a detent to assist in holding member 71 either in locking or released position.

At the close of a stopping operation the switch contacts 75, 75' are disengaged and the switch contacts 76, 76' engaged by the action of spring 74 in preparation for an automatic starting operation, and the coils 53 and 63 are at the same time deenergized, but as the armature 62 is pulled down on a fully charged (high voltage) state of the battery, and, as the closing (voltage) coil 55 is always in circuit and remains energized more or less in proportion to the voltage value of the battery, any lowered voltage of the battery is sufficient to weaken the voltage coil 55 so that the magnetic tension of said coil 55 can no longer hold the armature 62 attracted against the pull of its spring, whereby said armature is operated to disconnect current contacts 60, 61, and as switch contacts 76' are then left connected by the action of the spring 74, the engagement of the contact 82 of armature 62 with a contact 83 leading to a coil 84 forming part of a starting circuit, current will then flow from battery positive through conductors 54', 62', armature 62 through contacts 82, 83 to coil 84, energizing its core 85 to hold armature 62 upwardly and contacts 82, 83 firmly in connection to prevent sparking, the current passing from coil 84 through conductor 86 to coil 78 which swings latch member 70' of latch 71 to the left, releasing the latch from projection 69, whereby member 68 is rocked upwards by the springs 68', 38'' releasing lever 38, moving the solenoid core 52 upwards. In this action spring 74 is bent upwardly from the dotted line position to the full line position shown to engage the switch members 75' and 75 to set the electric controlling mechanism for speed controlling actions and for the next operation of stopping the windmill, also breaking the circuit at contacts 76' of switch member 76 in order to deenergize the entire starting.

The automatic electric speed controlling and starting mechanism and its circuit above described is similar to that in my aforesaid prior applications, Serial Nos. 715,552, now Patent No. 2,547,636, issued April 3, 1951. and 716,588 with the difference that in the present construction the controlling solenoid is composed of two coils, the speed governing coil 50 and the stopping coil 53 governing the latch 68.

In Fig. 4, I have shown a modification in which the block or hub 18a is splined to the shaft 2a, as by rib and groove driving connections 19a dispensing with the bushing 19. These connections which directly couple the block 18a to the shaft 2a to allow sliding movement of the block on the shaft to transmit direct driving motion from the block to the shaft 2a. The use of this spline connection 19a ensures smooth straight line shifting movements of the block 18a on the shaft 2a and winding and unwinding movements of the cables 27 about the blade shafts to overcome any tendency of the block to slip about the shaft and cause binding or cramping, with undue friction, between the parts in their shifting movements. This spline connection may be used as the sole driving connection between the block 18a and shaft 2a to simplify the construction, in which event the use of the driver parts 10, 12, 13 would be dispensed with, but both driving connections are preferably employed, as shown in Fig. 4, to effect the transmission of the driving forces from the blades to the shaft 2 at a plurality of points, radially of the block and blades and longitudinally of the shaft, to reduce the strain on each driving connection and better stabilize the transmission of the driving forces to the shaft.

In the modified construction shown in Figs. 5 to 8, inclusive, 1a represents a front outer hub or casing; 2b, the hollow shaft; and 3 the rear casing enclosing the generator, the armature of which is driven by shaft portion 7. The casing 1a includes front and rear walls 87 and 88, a hood 89 secured to the front wall, and bearings 90 and 90' in which are journaled the propeller shafts 91. The wall 88 has a hub sleeve 92 fitted to slide on and rotate with the shaft while the wall 87 has a threaded opening adjustably receiving a threaded and bushed hub sleeve 93 arranged to engage a stop nut 94 on the shaft and which is adjustable to vary the tension of the spring 97 to obtain any desired top speed of the propeller. The lock nut 93' secures the threaded hub sleeve 93 in any adjusted position. The block 95 is securely keyed and held from longitudinal movement by a nut 94 which forces said block against the shoulder 95' of the shaft 2b by means of the spacer sleeve 94' on which the bushed sleeve 93 is slidably mounted. The block 95 is arranged adjacent to the wall 88 between which and said block is a cushioning stop or bumper 96. The hub and casing thus constructed is limited in its forward sliding movement on shaft 2b by engagement of hub sleeves 92 and 93 with the stop member 96 and stop nut 94 and is mounted to slide rearwardly on the shaft responsive to wind thrusts on the blades from the normal position shown in Fig. 5 against the resistance of the coiled spring 97 arranged about the adjustable threaded sleeve 93 between the block 95 and said sleeve 93.

The propeller shafts 91 are axially adjustable to different pitch positions under rearward shifting movement of the casing 1a and against the resistance of springs 98 connecting them with their bearings and which assist in turning the propeller shafts in the reverse direction to that in which the shafts are turned by the backward sliding movement of the casing and to equalize them in the same axial position in case of any lost motion caused by any wearing out of any of the parts 106, 107, 108. At their inner ends the propeller shafts carry disks 99 from which extend journal pins 100 on which are fitted rollers 101 and 102. Rollers 101 are fitted to slide and rotate in the longitudinal guide grooves 105 formed in the ends of the block. The rollers 101 while sliding in the block grooves 105 also transmit the driving motion from the propeller to the shaft 2b, and rollers 102 engage the longitudinal slots 103 in the plates 104 which keep said plates in line to slide longitudinally between the block 95 and the disks 99. Also carried by the disks 99 are crank pins 106 carrying rollers 107 engaging transverse grooves 108 formed in the plates 104, whereby the plates 104 are adapted to shift longitudinally to force the propeller shafts to turn so to change the pitch of the blades. Fixed to the forward end of the shaft is a cross bar or yoke 109 which is connected by rods 110 with the plates 104. The rods are slidably mounted through holes bored in the wall 87. Springs 111 are disposed about the rods between the wall 87 and plates 104 which are yieldably tensioned by said springs 111 to keep the cross yoke 109 in normal position resting against the stop 109' at the tip of the shaft 2b, when the casing slides rearwardly or when the rods are slidably moved forwardly by said springs 111 to return the plates 104 to normal position at the stop 109.

In the operation of the propeller assuming the parts as shown in Fig. 5 to be in normal or starting position, the blades are adapted to turn to change their pitch to decrease the speed of the propeller when the hub moves rearwardly under wind pressures against the resistance of springs 97 and 98, which springs by reaction shift the hub forwardly from any of its rearwardly shifted positions for pitch changes of the blades to increase the propeller speed under decreasing wind pressures, the backward and forward sliding movements of the propeller occurring as the wind pressures vary to maintain a substantially high uniform propeller speed and to drive the generator normally at a substantially uniform high generating rate until the battery in the circuit supplied with current by the generator is charged to a certain extent.

The generator may be used to charge a circuit such as that shown in Fig. 1 or any other type of circuit. I have shown it, however, employed to charge a circuit C' including a battery 67, a back current relay switch 45' and a variable resistance 44', and including conductors 43', 49' and 51' and battery negative connection 47', the conductors 49' and 51' being connected to the poles of the solenoid coil 112 for automatically governing the propeller to control its speed as required according to the state of charge of the battery. The annular solenoid armature 113 is mounted to slide in a space between the coil and a cylindrical non-magnetic part 114 fixed to the rear end of the shaft 2b. The control rod 30' in this construction is fixed at its forward end to the cross bar or yoke 109 and extends at its rear end through the hollow shaft 2b. The control rod 30' is securely fastened to the solenoid armature 113 and rotatably connected as in Fig. 3 to the control lever 38'. The parts 112, 113 and 30' may be mounted in a tail casing 115 secured to wall 6. The cable 40' leading from lever may be connected through the spring 38'' with a hand lever, such as lever 41 in Fig. 1, to adapt the propeller pitch to be manually adjusted or thrown into and out of operation while the solenoid controls the speed of the propeller according to circuit conditions and regardless of wind speeds. The current that is supplied to the coil 112 to energize, in amount dependent on the value of the resistance 44' and upon a partial or total charging rate of the generator, energizes the solenoid to attract the armature which through rod 30' moves plates 104 forwardly to axially adjust the propeller blades beyond normal in the opposite direction to the sliding movements of the blades by the block 45 to reduce the speed of the propeller and charging rate when necessary, as when the battery is nearly charged. When the battery is fully charged and the resistance 44' entirely cut in, in the use of an adjustable resistance, all the current generated energizes the solenoid coil to cause a further forward movement of the armature whereby the propeller blades will be axially shifted towards the stopping position to reduce the propeller speed. Any reduction of the charging rate causes a partial de-energizing of the solenoid 112, 113 so that the rod 30', plates 104 and cooperating parts slide backward to shift the pitch of the propeller to a higher angle of attack forcing said propeller to run faster so that the charging rate of the driven generator is augmented to correspondingly energize the solenoid, it being understood that by this means a balancing action between the propeller speed and the generator charging rate is constantly maintained by the action of the more or less energized or de-energized solenoid and the adjusted value of the resistance to maintain the speed of the propeller at a reduced and constant top speed and to regulate the charging rate of the generator according to the state of charge of the battery and circuit conditions. This way of controlling has the great advantages that the current of the generator and voltage of the circuit is maintained at the best rates to avoid variations in the luminous power of the lights or flickering of the same, an objection incident to other wind electric generating systems. Another great advantage of this way of controlling the charging operation is that the generator is operable to charge the battery at low speeds of the propeller and the wind, as no shunt resistance is employed.

In the modified construction shown in Figure 9, the hollow propeller shafts 16' are mounted for rotation on the spindles 17' fixed to a block or hub 116 slidable on the shaft 2c, the shafts 16' being slidable in slots between the arms 14' of a driver frame 10' including a disk or plate 13' carried by a sleeve or collar 16'' keyed to the shaft 2c to drive said shaft and rotate therewith. The propeller shafts are also slidable in slots between the arms 11' of an adjusting frame 9' including a sleeve member 8a slidable on the shaft 2c and in engagement with a shifter ring 117 held in engagement therewith by a nut 118. The ring 117 is provided with pins 119 engaged by the fork arms of a controlling lever 38a to which the control cable 40a is connected through the spring 40b. The shaft 2c has a threaded intermediate portion on which are adjustably mounted abutment nuts 120 and 121. On the shaft 2c between the block 116 and nut 120 is arranged a spring 24' and on said shaft between the sleeve 9a and nut 121 is a spring 37'. The sleeve or collar 16" provides a stop means on the shaft 2c which limits the forward sliding movement of the hub 116 on the shaft, against which sleeve or collar the hub abuts in its normal position under pressure of the spring 24. Cables 27' terminally fastened to the ends of the frame arms 11' of frame 9, and having coiled portions 28' encircling and secured to the propeller shafts 16' and secured thereto by fastenings 29', are provided to rotatably adjust the propeller blades in one direction or the other as the hub and blades slide rearwardly under wind pressures against the resistance of the spring 24', the frame member 9' being moved forwardly by lever 38a against the resistance of the spring 37'. The operation of this form of the invention will be readily understood from the description applying to Figures 1 to 3 inclusive.

Figure 10 shows a modified form of block or hub member 95' designed for use with the type of construction shown in Figure 5 for a three-bladed propeller, the block having three equally spaced arms provided with grooves 105' to receive the rollers 101 of the pins 100 on a corresponding number of propeller shafts. Hub blocks for use in propellers having any desired number of blades, and suitably constructed for use therewith may, of course, be employed.

From the foregoing description, taken in connection with the accompanying drawings, the construction, mode of operation and advantages of my improved construction of propeller will be readily understood and appreciated by those versed in the art without a further and extended description. It is to be understood that while the constructions shown herein are preferred, changes in the form, construction and arrangement of parts, within the scope of the appended claims, may be made without departing from the spirit or sacrificing any of the advantages of the invention. While the propeller as herein shown and described as a windmill propeller for operating windmill mechanism or driving a generator, it is to be understood that it may be used for other purpose for which it is adapted. It will, of course, be understood that the propeller may have any desired number of blades.

Having thus described my invention, I claim:

1. A propeller structure including in combination a rotatable shaft, a hub carrying rotatably adjustable blades and slidable from a normal forward position rearwardly on the shaft under increasing wind pressures to different degrees to progressively change the pitch of the blades to reduce the propeller speed and slidable forwardly to normal position to increase the propeller speed, a driver fixed to the shaft and receiving motion from the propeller to drive the shaft while the propeller slides on said shaft, means for yieldingly resisting the rearward movement of the propeller under increasing wind pressures and moving it forwardly to normal position under decreasing wind pressures, supporting means having portions located in front and rear of the propeller blades, and connections between said portions of the supporting means and the blades operating in such rearward and ensuing forward movements of the hub to axially adjust the blades respectively to speed reducing and speed increasing positions.

2. A propeller structure including in combination a rotatable shaft, a hub carrying rotatably axially adjustable blades and slidable from a normal forward position rearwardly on the shaft under increasing wind pressures to different degrees to progressively change the pitch of the blades to reduce the propeller speed and slidable forwardly to normal position to increase the propeller speed, a driver fixed to the shaft and receiving motion from the hub to drive the shaft, means for yieldingly opposing the rearward movement of the hub under increasing wind pressures and moving it forwardly to normal position under decreasing wind pressures, said driver including a sliding support having portions located in front and rear of the propeller blades, connections between said portions of the support and the blades, and motion transmitting connections between the blades and said portions of the support, operating in such rearward and forward movements of the hub from and toward normal position to axially adjust the blades respectively to speed reducing and speed increasing positions, means for normally holding the support from sliding movements in such blade adjusting movements of the hub and motion transmitting connections, and means for sliding the support to adjust the blades through said connections from starting and high speed running to speed reducing and stopping positions and vice versa.

3. A propeller structure including in combination a rotatable shaft, a hub carrying rotatably adjustable blades and slidable from a normal starting and running position rearwardly on the shaft under increasing wind pressures to different degrees to progressively change the pitch of the blades to reduce the propeller speed and slidable forwardly to starting position to increase the propeller speed, driving means for driving the shaft from the hub, means for yieldingly resisting the movement of the hub away from starting position under increasing wind pressures and moving it back to starting position under decreasing wind pressures, a support having portions located in front and rear of the blades, and cables fixed to said portions of the support and wound about and secured to the blades and operating in such sliding movements of the hub to adjust the blades respectively to speed reducing and speed increasing positions.

4. In an aerial propeller, a rotary shaft, a hub carrying rotatably adjustable blades and slidably movable in one direction on the shaft under increasing wind pressures to change the pitch of the blades for speed reducing actions, resilient means yieldingly resisting such sliding movement of the propeller and operative to slidably move the hub in the opposite direction to change the pitch of the blades for speed increasing actions, a driver fixed to the shaft and operable by the hub to drive the shaft therefrom, supporting means mounted on the shaft, and cable connections between the supporting means and blades having winding and unwinding portions engaging the blades for adjusting the blades for such pitch changes.

5. A propeller having blades adjustable to different pitch angles, a shaft, and a motion transmitting means for adjusting the blades including a support, the propeller and support being relatively adjustable longitudinally on the shaft, and winding and unwinding cables connecting the blades with the support and movable in opposite directions by relative sliding movements of the propeller and support to adjust the blades to different angular positions.

6. A propeller comprising a rotatable shaft, a hub member slidable in one direction on the shaft from an initial position and in the opposite direction back to such position, a driver fixed to the shaft, blades mounted on the hub member for adjustment to different pitch angles, a frame structure mounted on the shaft for rotation therewith and having members arranged in front and rear of the blades, motion transmitting cables intermediately wound about and secured to the blades and secured at their ends to the frame members and operative when the hub and blades are moved in one direction from initial position under increasing wind pressures to adjust the blades to pitch angles progressively reducing the propeller speed and gradually operative in the movements of the hub and blades back to initial position to adjust the blades to pitch angles progressively increasing the propeller speed as the wind decreases, and spring means for yieldingly resisting the sliding movement of the hub and blades in the first named direction under increasing wind pressures and slidably moving the same in the second named direction under reduced wind pressures.

7. A propeller comprising a rotatable shaft, a block fixed to the shaft and rotatable therewith, a casing fixed to the shaft and slidable thereon away from and back to an initial position, propeller blades having their shafts rotatably mounted in the casing, slotted motion transmitting members in the casing, journals on the blade shafts rotatable in the slots in said members and slidable therein and slidably engaging the block, crank pins on the blades engaging the motion transmitting members for rotatably adjusting the blades when the casing is slidably moved independent of the motion transmitting members or when said members are slidably moved independently of the casing, the casing being slidably moved in the direction away from its initial position under increasing wind pressures on the blades, spring means for yieldingly resisting the sliding movement of the casing in such direction and slidably moving it back to initial position under decreasing wind pressures, spring means for maintaining the motion transmitting members in a normal position and holding the same from sliding movement, and means for slidably moving the motion transmitting members to rotatably adjust the blades to different pitch angle positions.

8. A propeller comprising a shaft; a hub block slidable on the shaft rearwardly from an initial position and back to initial position, a driver fixed to the shaft, blades carried by the hub member and axially adjustable from an initial position for pitch changes reducing the propeller speed under increasing wind pressures in the movement of the hub block away from initial position and for pitch changes increasing the propeller speed in the movement of the hub block back to initial position under decreasing wind pressures, said blades being arranged to transmit motion to the driver, a frame structure on the shaft having members arranged in front and rear of the blades, motion transmitting cables intermediately wound about and intermediately secured to the blades and secured at their ends to the frame members for adjusting the blades axially when the block and blades are slidably moved in the sttaed directions to govern the speed of the propeller, and spring means for yieldingly resisting the sliding movement of the hub block and blades away from their initial position and operating to slidably move them back to initial position under reduced wind pressures.

9. A propeller of the character set forth in claim 6 wherein the frame structure is slidably movable back and forth to shift the blades from starting and running position to stopping position and vice versa.

10. A propeller of the character set forth in claim 6 wherein the frame structure is slidably movable back and forth to shift the blades from starting position to stopping position and vice versa, and spring means for yieldingly resisting movement of the frame structure in the first-named direction and running it in the second-named direction.

11. A winddriven propeller including in combination a rotatable shaft, a reciprocable hub slidably movable on the shaft rearwardly from and forwardly back to a normal position, propeller blades rotatably mounted on the hub for adjustment to different angle positions, the hub and blades being movable rearwardly on the shaft under wind increasing pressures, means for yieldingly resisting the rearward movements of the shaft and blades and moving them back to normal position under relatively reduced wind pressures, the blades having a comparatively high speed normal starting and running position and being adjustable on such rearward and forward sliding movements of the hub to angular pitch positions, respectively reducing and increasing the propeller speed so as to normally maintain a substantially constant comparatively high propeller speed, said blades being also adjustable from said normal starting and running position to an arbitrary slow speed running position, blade angle adjusting means normally stationary with respect to the hub and including front and rear supporting members and coupling means connecting the same and engaging the blades to adjust the blades to speed reducing and increasing positions when the hub is slidably moved and said blade angle adjusting means remains stationary, said blade angle adjusting means including members movable independently on the hub for adjusting the blades to their arbitrary slow speed running position, means for yielding resisting movement of the blade angle adjusting means and maintaining it in a normally stationary position, and means for actuating said blade adjusting means to adjust the blades to the slow speed running position.

12. A winddriven propeller including in combination a rotary, non-slidable shaft, a reciprocable hub slidably mounted on the outer surface of the shaft between its ends for rearward movements from and forward return movements back to a normal propeller starting position on the shaft and carrying variable pitch blades, stop means carried by the shaft for limiting the forward sliding movement of the hub on the shaft, resilient means on the shaft arranged to hold the hub in engagement with said stop means for normally maintaining the hub in propeller starting position and for yieldingly resisting the rearward sliding movements of the hub from such position, a driving connection between the blades and shaft for rotating the shaft responsive to wind thrusts on the blades said hub being reciprocable rearwardly from and forwardly back to such starting position in response to varying wind pressures acting on the blades and to the counteracting force of said resilient means respectively to automatically change the pitch angle of the blades from a predetermined starting speed angle to other speed angles to maintain a given running speed of the propeller at all wind speeds, a normally stationary variable transmission means supported by the shaft and coupled to the blades to rotate the same in the reciprocating movements of the hub to so change the pitch angles of the blades, a normally inactive movable member connected to the transmission means and movable forwardly from a normally stationary position relative to the shaft for varying the action of the transmission means to arbitrarily change the pitch angle of the blades independently of hub movements, and means connected with said member for moving it forwardly to so shift the transmission.

13. A winddriven propeller structure including in combination a frame, a rotary, non-slidable shaft mounted thereon, a reciprocable hub slidably mounted on the outer surface of the shaft between its ends for rearward movements from and forward return movements back to a normal propeller starting position on the shaft and carrying variable pitch blades, stop means on the shaft for limiting the forward sliding movement of the hub on the shaft, resilient means on the shaft normally holding the hub in engagement with said stop means for normally maintaining the hub in propeller starting position and for yieldingly resisting the sliding movements of the hub from such position, a driving connection between the blades and shaft for rotating the shaft responsive to wind thrusts on the blades said hub being slidable rearwardly from said starting position in response to varying wind pressures and the counteracting force of said resilient means cooperatively acting to automatically change the pitch angle of the blades from a predetermined starting speed angle to other speed angles to maintain a given running speed of the propeller at all wind speeds, a normally stationary variable transmission means supported by the shaft and coupled to the blades to rotate the blades in the reciprocating movements of the hub to so change the pitch angles of the blades said transmission means being shiftable relative to the hub and blades to arbitrarily rotate the blades to other pitch angles, a normally inactive movable member connected to the transmission means so as to be normally ineffective for action thereon but being movable forwardly from a normally stationary position longitudinally of the shaft for shifting the transmission means to arbitrarily change the pitch angle of the blades independently of hub movements, resilient means acting on said member for normally holding said member in its normally inactive position and yieldingly resisting its forward movement, and manually operable means automatically operating connected with said member and responsive to the speed of the shaft for moving said member forwardly against the resistance of said resilient means when the speed of the shaft exceeds a predetermined speed.

14. A winddriven propeller including in combination a rotary, non-slidable shaft, a reciprocable hub slidably mounted on the outer surface of the shaft between its ends for rearward movements from and forward return movements back to a normal propeller starting position on the shaft and carrying variable pitch blades, stop means on the shaft for limiting the forward sliding movement of the hub on the shaft, and against which the hub abuts in the normal starting position of the propeller, resilient means acting on the hub to hold the hub in engagement with said stop means for normally maintaining the hub in propeller starting position and for yieldingly resisting the sliding movements of the hub from such position, a driving connection between the blades and shaft for rotating the shaft responsive to wind thrusts on the blades, said hub being reciprocable rearwardly from and forwardly back to starting position respectively in response to varying wind pressures acting on the blades and to the counteracting force of said resilient means to automatically change the pitch angle of the blades from a predetermined starting speed angle to other speed angles to maintain a given running speed of the propeller at all wind speeds, a normally stationary variable transmission means supported by the shaft and coupled to the blades and normally operative in the sliding movements of the hub and blades relative thereto to rotate the blades to so change the pitch angles of the blades, a normally inactive movable member connected to the transmission means so as to be ineffective for action on the transmission means through the normal sliding movements of the hub but being movable forwardly from a normally stationary position relative to the shaft for shifting the transmission means relative to the hub to rotate the blades to arbitrarily change the pitch angle of the blades independently of hub movements, resilient means acting on said member for normally holding said member in its normally inactive position and yieldingly resisting its forward movement, a generator driven by the shaft, and means responsive to an action of the generator and connected with said member for moving it forwardly against the resistance of said resilient means.

15. A winddriven propeller including in combination a rotary, non-slidable shaft, a reciprocable hub slidably mounted on the outer surface of the shaft between its ends for rearward movements from and forward return movements back to a normal propeller starting position on the shaft and carrying variable pitch blades, stop means on the shaft for limiting the forward sliding movement of the hub on the shaft, resilient means acting on the hub and pressing the same against said stop means for normally maintaining the hub in propeller starting position and for yieldingly resisting the sliding movements of the hub from such position, a driving connection between the blades and shaft for rotating the shaft responsive to wind thrusts on the blades said hub being reciprocable rearwardly from and forwardly back to starting position in response to varying wind pressures acting on the blades and to the counteracting force of said resilient means to automatically change the pitch angle of the blades from a predetermined starting speed angle to other speed angles to maintain a given running speed of the propeller at all wind speeds, a normally stationary variable transmission means supported by the shaft and coupled to the blades to rotate the blades in the sliding movements of the hub on the shaft to so change the pitch angles of the blades, a normally inactive movable member connected to the transmission means so as to be normally ineffective for action on the blades during the normal sliding movements of the hub but being movable forwardly from a normally stationary position relative to the shaft and hub for shifting the transmission means relative to the hub to rotate the blades to arbitrarily change the pitch angle of the blades independently of hub movements, resilient means acting on said member for normally holding said member in its normally inactive position and yieldingly resisting its forward movement, a generator driven by the shaft, and a solenoid in circuit with the generator and connected with said member for moving it forwardly against the resistance of said resilient means.

16. A winddriven propeller including in combination a rotary, non-slidable hollow shaft, a reciprocable hub slidably mounted on the outer surface of the shaft between its ends for rearward movements from and forward return movements back to a normal propeller starting position on the shaft and carrying variable pitch blades, stop means on the shaft for limiting the forward sliding movement of the hub on the shaft and against which the hub abuts in the normal starting position of the propeller, counterforce resilient means acting on the hub and holding it in engagement with said stop means for normally maintaining the hub in propeller starting position and for yieldingly resisting the sliding movements of the hub from such position, a driving connection between the blades and shaft for driving the shaft responsive to wind thrusts on the blades, said hub being reciprocable rearwardly from and forwardly back to starting position in response to varying wind pressures on the blades and to the counteracting force of said resilient means to automatically change the pitch angle of the blades from a predetermined starting speed angle to other speed angles to maintain a given running speed of the propeller at all wind speeds, a rod extending through the shaft, a variable transmission means including a normally stationary supporting frame comprising supporting members disposed about the shaft and hub and motion transmitting members carried thereby and coupled to the blades, said motion transmitting members being free from connection with the hub and shiftable with the frame forwardly and rearwardly on the shaft and being operable on the blades in the stationary position of the frame when the blades are reciprocated with the hub to rotate the blades to change their pitch angles to maintain the given running speed of the propeller, and said transmission members being shiftable forwardly with the frame for action on the blades to rotate the blades to arbitrarily change their pitch angles independent of the hub movements, said transmission, frame also including a shifting member connected to said rod and movable forwardly from normal position thereby, resilient means for normally holding said rod and shifting member in a normally stationary position and yieldingly resisting its forward movement thereof, and means connected with said rod for moving it forwardly against the resistance of said resilient means.

17. A winddriven propeller including in combination a rotary, non-slidable shaft, a reciprocable hub slidably mounted on the outer surface of the shaft between its ends for rearward movements from and forward return movements back to a normal propeller starting position on the shaft and carrying variable pitch blades, stop means on the shaft for limiting the forward sliding movement of the hub on the shaft, resilient means acting on the hub to press the same toward the stop means and cooperating with said stop means for normally maintaining the hub in propeller starting position and for yieldingly resisting the sliding movements of the hub from such position, a driving connection between the blades and shaft for rotating the shaft in response to wind thrusts acting on the blades, said hub being reciprocable rearwardly from and forwardly back to starting position in response to varying wind pressures acting on the blades and to the counteracting force of said resilient means to automatically change the pitch angle of the blades from a predetermined starting speed angle to other speed angles to maintain a given running speed of the propeller at all wind speeds, and a variable transmission means carried by the shaft and coupled to the blades and operative in the reciprocating movements of the hub on the shaft to automatically change the pitch angle of the blades responsive to the wind pressures on the blades and the counteracting force of said resilient means.

18. A winddriven propeller including in combination a non-slidable rotary shaft, a sliding hub carrying variable pitch blades and mounted to reciprocate on the outer surface of the shaft from and back toward a normal propeller starting position, stop means on the shaft for limiting the forward movement of the hub on the shaft, resilient counterforce means acting to normally hold the hub in engagement with the stop means and cooperating with said stop means for normally maintaining the hub in starting position and for yieldingly resisting the rearward sliding movement of the hub, a driving connection between the blades and shaft for driving the shaft responsive to wind thrusts on the blades, said hub being reciprocable on the shaft responsive to varying wind pressures on the blades and to the counteracting force of said resilient means to automatically change the pitch angle of the blades to normally maintain a given speed of the propeller at all wind speeds, a normally stationary shiftable transmission structure supported by the shaft and slidable forwardly on the shaft from a normal position and back to normal position and including shifting elements coupled to the blades to rotate the blades, said elements being operable on the blades in the normal position of said structure and through the backward and forward sliding movements of the hub to adjust the blades between starting and other pitch angles to maintain a given speed of the propeller under wind thrusts on the blades and said elements being shiftable forwardly by said structure for travel and independently of any action on the hub thereon to adjust the blades to arbitrarily change their pitch angles to reduce the propeller speed, a generator driven by the shaft, and electromagnetic means in circuit with the generator and responsive to an action thereof for shifting said transmission structure.

19. A winddriven propeller including in combination a non-slidable rotary shaft, a sliding hub arranged about the outer surface of the shaft and carrying variable pitch blades and reciprocable on the shaft from and back toward a normal propeller starting position, stop means on the shaft for preventing forward sliding movement of the hub beyond its starting position, resilient means for normally holding the hub in contact with said stop means and yieldingly resisting the rearward sliding movement of the hub, a driving connection between the blades and shaft for rotating the shaft responsive to wind thrusts on the blades, said hub being reciprocable rearwardly from and back to starting position on the shaft in response respectively to varying wind pressures acting on the blades and to the counteracting force of said resilient means acting on the hub to automatically change the pitch angle of the blades to normally maintain a given speed of the propeller at all wind speeds, a normally stationary transmission supported by the shaft and including motion transmitting elements separate from the hub but coupled to the blades and normally responsive to such hub movements in the normal stationary position of the transmission to so change the pitch angles of the blades, said transmission being slidably shiftable on the shaft, a normally inactive movable member supported by the shaft and connected to the transmission and movable forwardly from a normal position relative to the shaft to shift the transmission to arbitrarily change the pitch angle of the blades independently of hub movements, resilient means acting on said member for normally holding said member in its normally inactive position and yieldingly resisting its forward movement, a generator driven by the shaft, and electromagnetic means connected with said member and responsive to an action of the generator for moving said member forwardly against the resistance of said resilient means.

20. A winddriven propeller including in combination a non-slidable rotary shaft, a sliding hub surrounding the shaft and carrying variable pitch blades and reciprocable on the shaft from and back toward a normal propeller starting position, stop means on the shaft for limiting the forward movement of the hub and against which the hub abuts in the propeller starting position of the blades, resilient means for holding the hub in engagement with the stop means and yieldingly resisting the rearward sliding movement of the hub, a driving connection between the blades and shaft for rotating the shaft responsive to wind thrusts on the blades, said hub being reciprocable on the shaft responsive to varying wind pressures on the blades and to the counteracting force of said resilient means to automatically change the pitch angle of the blades to normally maintain a given speed of the propeller at all wind speeds, a normally stationary transmission slidably shiftable on the shaft and including transmission members coupled to the blades and normally responsive in the normal position of the transmission to such hub movements to so change the pitch angles of the blades, a normally inactive movable member supported by the shaft and connected to the transmission and movable forwardly from a normal position relative to the shaft to shift the transmission to arbitrarily change the pitch angle of the blades independently of hub movements, resilient means acting on said member for normally holding said member in its normally inactive position and yieldingly resisting its forward movement, a generator driven by the shaft, and electromagnetic means controlled in action by the generator for moving said member against the resistance of said resilient means, said means comprising an annular solenoid coil arranged concentric with the shaft axis and an armature slidable on the shaft and connected to said member.

21. A winddriven propeller including in combination a non-slidable rotary shaft, a hub surrounding the shaft and slidable thereon and carrying variable pitch blades and reciprocable on the shaft from and back toward a normal propeller starting position, stop means on the shaft, resilient means for holding the hub normally in engagement with said stop means and for yieldingly resisting the rearward sliding movement of the hub, a driving connection between the blades and shaft to rotate the shaft in response to wind thrusts on the blades, said hub being reciprocable on the shaft responsive to varying wind pressures acting on the blades and to the counteracting force of said resilient means to change the pitch angle of the blades to normally maintain a given speed of the propeller at all wind speeds, a normally stationary transmission slidably shiftable on the shaft and including transmission members coupled to the blades and responsive to such hub movements in the normal position of the transmission to so change the pitch angles of the blades, a normally inactive movable member supported by the shaft connected to the transmission and movable forwardly from a normal position relative to the shaft to shift the transmission to arbitrarily change the pitch angle of the blades independently of hub movements, resilient means acting on said member for normally holding said member in its normally inactive position and yieldingly resisting its forward movement, a generator driven by the shaft, and electromagnetic means connected with said member and controlled by current from the generator for moving said member forwardly against the resistance of said resilient means, said means comprising a solenoid coil in circuit with the generator and an armature actuated thereby and connected to said member.

22. A winddriven propeller comprising a non-sliding rotary shaft, a hub surrounding the shaft and slidably adjustable thereon rearwardly from and backwardly to a normal starting position in the shaft, rotatably adjustable blades carried by the hub, the blades being adjustable through sliding movements of the hub on the shaft in one direction from its normal position under progressive wind forces acting thereon to reduce the propeller speed, and said blades being adjustable through reverse sliding movements of the hub on the shaft back toward normal position under ensuing relatively reduced wind forces acting thereon to increase the propeller speed, a driving connection between the blades and shaft for rotating the shaft responsive to wind forces acting on the blades, shifting means carried by the shaft and coupled to the blades and operative in the sliding movements of the hub on the shaft to adjust the blades, and a resilient counterforce means mounted on the shaft and acting on the hub against the wind forces for yieldingly resisting the sliding movements of the hub from normal position under increasing wind forces and effecting sliding movements of the hub back to normal position under relatively reduced wind forces, said shifting means operating as the hub is reciprocated under such forces varying accordingly to automatically adjust the blades to different positions to the wind forces to produce an automatic speed governing action to drive the shaft at a substantially constant speed regardless of the intensities of the wind forces acting on the blades.

23. A wind-driven propeller comprising a non-sliding rotary shaft, a hub surrounding the shaft and slidably adjustable thereon rearwardly from and backwardly to a normal starting position in the shaft, rotatably adjustable blades carried by the hub, the blades being adjustable through sliding movements of the hub on the shaft in one direction from its normal starting position under progressive wind forces acting thereon to reduce the propeller speed, and said blades being adjustable through reverse sliding movements of the hub on the shaft back toward normal position under ensuing relatively reduced wind forces acting thereon to increase the propeller speed, a driving connection between the blades and shaft for rotating the shaft responsive to wind forces acting on the blades, a counterforce spring arranged on the shaft and acting on the hub against the wind forces for normally holding the hub in starting position and yieldingly resisting the sliding movements of the hub from starting position and effecting sliding movements of the hub back to starting position in the presence of the relatively reduced wind pressures, adjusting means for adjusting the hub on the shaft and regulating the pressure of the spring on the hub, and blade shifting means supported by the shaft and including shifting members disposed in spaced relation radially to the outer surface of the shaft beyond the hub and parallel with the shaft and coupled to the blades and traversed thereby in the sliding movements of the hub under the wind forces and counteracting force of the spring to automatically adjust the blades to different speed positions to produce an automatic speed governing action to drive the shaft at a substantially constant speed regardless of the intensities of the wind forces acting on the blades.

24. A wind-driven propeller comprising a nonsliding rotary shaft, a hub surrounding the shaft and slidably adjustable thereon rearwardly from and backwardly to a normal starting position on the shaft, rotatably adjustable blades carried by the hub, the blades being adjustable through sliding movements of the hub on the shaft in one direction from its normal starting position under progressive wind forces acting thereon to reduce the propeller speed, and said blades being adjustable through reverse sliding movements of the hub on the shaft back toward normal position under ensuing relatively reduced wind forces acting thereon to increase the propeller speed, a driving connection between the blades and shaft for rotating the shaft responsive to wind forces acting on the blades, stop means in the shaft for limiting the forward sliding movement of the hub and against which it abuts in its starting position, a counterforce spring mounted on the shaft and acting on the hub against the wind forces for normally holding the hub in starting position against said stop means and yieldingly resisting the sliding movements of the hub from starting position and effecting sliding movements of the hub back to starting position in the presence of the relatively reduced wind forces, and blade shifting means supported by the shaft and including adjusting members arranged radially beyond the shaft and hub parallel with the shaft and operative on the blade in the sliding movements of the hub under the wind forces and counteracting force of the spring to automatically adjust the blades to different speed positions to produce an automatic speed governing action to drive the shaft at a substantially constant speed regardless of the intensities of the wind forces acting on the blades.

25. A wind-driven propeller comprising a non-sliding rotary shaft, a hub surrounding the shaft and slidably adjustable thereon rearwardly from a normal starting position on the shaft and back to starting position, rotatably adjustable blades carried by the hub, the blades being adjustable through sliding movements of the hub on the shaft in one direction from its normal starting position under progressive wind forces acting on the blades to reduce the propeller speed, and said blades being adjustable through reverse sliding movements of the hub on the shaft back toward normal position under relatively reduced wind forces on the blades to increase the propeller speed, a driving connection between the blades and shaft for rotating the shaft responsive to wind forces acting on the blades, said driving connection including guide members arranged radially beyond and parallel with the shaft and slidably engaged by the blades in the movements of the hub and operating to transmit the wind thrusts to the shaft, a counterforce spring arranged on the shaft and acting on the hub against the wind forces for normally holding the hub in starting position and yieldingly resisting the sliding movements of the hub from starting position under the relatively reduced wind forces and blade shifting means supported by the shaft and coupled to the blades and operative in the sliding movements of the hub under the wind forces and counteracting force of the spring to automatically adjust the blades to different speed positions to produce an automatic speed governing action to drive the shaft at a substantially constant speed regardless of the intensities of the wind forces acting on the blades.

26. A wind-driven propeller comprising a non-sliding rotary shaft, a hub surrounding the shaft and slidably adjustable thereon, rotatably adjustable blades carried by the hub, the blades being adjustable through sliding movements of the hub on the shaft in one direction from a normal starting position under progressive wind pressures acting thereon to reduce the propeller speed, and said blades being adjustable through reverse sliding movements of the hub on the shaft back toward starting position under ensuing decreasing wind pressures acting thereon to increase the propeller speed, a driving connection between the blades and shaft for rotating the shaft responsive to wind forces acting on the blades, a counterforce spring on the shaft acting on the hub against the wind forces for normally holding the hub in starting position and yieldingly resisting the sliding movements of the hub back to starting position and effecting sliding movements of the hub back to starting position under the relatively reduced wind forces, normally stationary blade shifting means supported by the shaft and including shifting elements arranged parallel with the shaft radially beyond the shaft and hub and coupled to the blades so as to be operative on the blades in the stationary position of said shifting means and in the shifting movements of the hub relative thereto under the wind forces and counteracting force of the spring to automatically adjust the blades to different speed positions to produce an automatic speed governing action to drive the shaft at a substantially constant speed regardless of the intensities of the wind forces acting on the blades, and means for adjusting said blade shifting means relative to the shaft, hub and blades to arbitrarily adjust the blades to other speed positions.

27. A wind-driven propeller comprising a non-slidable rotary shaft, a hub surrounding the shaft and mounted to rotate therewith and reciprocate thereon, rotatably adjustable blades carried by the hub, the blades being adjustable through sliding movements of the hub in one direction from a normal position under progressive wind forces acting thereon to reduce the propeller speed, and said blades being adjustable through reverse sliding movements of the hub back toward normal position in the presence of ensuing relatively reduced wind forces acting thereon to increase the propeller speed, a driving connection between the blades and shaft for rotating the shaft responsive to wind forces acting on the blades, shifting means supported by the shaft and coupled to the blades and operative in the sliding movements of the hub on the shaft to adjust the blades, stop means on the shaft for limiting the forwardly sliding movement of the hub on the shaft, and a resilient counterforce means on the shaft for normally holding the hub in starting position against said stop means and acting on the hub against the wind forces for yieldingly resisting the rearward sliding movements of the hub from normal starting position under increasing wind forces and effecting sliding movements of the hub back to normal starting position under relatively reduced wind pressures to cause said shifting means to automatically adjust the blades to different speed positions as and when the wind forces vary, the ratio of adjustment of the blades under such forces being such as to produce an automatic speed governing action to drive the shaft at a substantially constant speed regardless of the intensities of the wind forces acting on the blades.

28. A wind-driven propeller comprising a rotary shaft, a hub surrounding the shaft and rotatable therewith and slidable on the shaft rearwardly and forwardly from a normal starting position on the shaft, rotatably adjustable blades carried by the hub, the blades being adjustable through relative sliding movements between the hub and shaft in one direction from a normal starting position under progressive wind forces acting on the blades to reduce the propeller speed, and said blades being adjustable through reverse relative sliding movements between the hub and shaft back toward normal position under ensuing relatively reduced wind forces acting on the blades to increase the propeller speed, a driving connection between the blades and shaft for rotating the shaft responsive to wind forces acting on the blades, shifting means supported by the shaft and coupled to the blades and automatically operative in the relative sliding movements between the hub and shaft to adjust the blades, resilient counterforce means on the shaft and acting on the hub against the wind forces for yieldingly resisting the relative sliding movements of the hub and shaft from normal position under increasing wind forces and effecting relative sliding movements of the hub and shaft back to normal position under relatively reduced wind forces to cause said shifting means to automatically adjust the blades to different speed positions as the wind forces vary, the ratio of adjustment of the blades under such forces being such relative thereto as to produce an automatic speed governing action to drive the shaft at a substantially constant speed regardless of the intensities of the wind forces acting on the blades, and means on the shaft for regulating the force of the spring and sliding movements of the hub under the wind forces.

29. A wind-driven propeller comprising a non-sliding rotary shaft, a hub surrounding the shaft and slidably adjustable thereon rearwardly from a normal starting position and forwardly back to starting position, rotatably adjustable blades carried by the hub, the blades being mounted for adjustment on the rearward sliding movements of the hub from normal starting position under progressive wind forces acting on the blades to reduce the propeller speed and for adjustment on the reverse sliding movements of the hub back toward normal position under ensuing reduced wind forces on the blades to increase the propeller speed, a driving connection between the blades and shaft for rotating the shaft responsive to wind forces acting on the blades, a stop means on the shaft against which the hub abuts in starting position, a counterforce spring arranged on the shaft and acting on the hub against the wind forces for normally holding the hub in starting position against said stop means and yieldingly resisting the sliding movements of the hub away from starting position and effecting sliding movements of the hub back to starting position under the relatively reduced wind forces, normally stationary blade shifting means supported by the shaft and coupled to the blades to rotate the same through an action in which the blades slide along said means and are rotated thereby in the sliding movements of the hub under the wind forces and counteracting force of the resilient means to automatically adjust the blades to different speed positions to produce an automatic speed governing action to drive the shaft at a substantially constant speed regardless of the intensities of the wind forces acting on the blades, and means for shifting said shifting means relatively of the shaft, hub and blades longitudinally of the shaft and wholly independent of the hub to rotate the blades to other speed positions.

30. A wind-driven propeller comprising a non-sliding rotary shaft, a hub surrounding the shaft and slidably adjustable thereon to different degrees rearwardly from a normal starting position on the shaft and forwardly therefrom back to starting position, rotatably adjustable wind driven blades carried by the hub and operative by wind thrusts thereon to slide the hub rearwardly, the blades being mounted for adjustment on the rearward sliding movements of the hub on the shaft from a normal starting position under progressive wind forces acting thereon for pitch changes to reduce the propeller speed, and for adjustment on the reverse sliding movements of the hub on the shaft back toward starting position under relatively reduced wind forces acting thereon for pitch changes to increase the propeller speed, a driving connection between the blades and shaft for rotating the shaft responsive to wind forces acting on the blades, a counterforce spring arranged about the shaft and acting on the hub against the wind forces to normally maintain the hub in starting position and to yieldingly resist the sliding movements of the hub from starting position under the pressure of the progressive wind forces on the blades and to effect sliding movements of the hub back to starting position in the presence of relatively reduced wind forces acting on the blades, and blade shifting means comprising a frame supported by the shaft and cables carried by the frame and coupled to the blades for action thereon in the sliding movements of the hub under the wind forces and the counteracting force of the spring to automatically adjust the blades to different speed positions to produce an automatic speed governing action to drive the shaft at a substantially constant speed regardless of the intensities of the wind forces acting on the blades.

31. A wind-driven propeller comprising a non-sliding rotary shaft, a hub surrounding the shaft and slidably adjustable thereon, rotatably adjustable blades carried by the hub, the blades being adjustable through sliding movements of the hub on the shaft in one direction from a normal position under progressive wind forces acting on the blades to reduce the propeller speed, and said blades being adjustable through reverse sliding movements of the hub on the shaft back toward normal position under ensuing relatively reduced wind forces on the blades to increase the propeller speed, a driving connection between the blades and shaft for rotating the shaft responsive to wind forces acting on the blades, stop means on the shaft for limiting the sliding movements of the hub in one direction and against which the hub abuts in its normal position, shifting means supported by the shaft and coupled to the blades and operative in the sliding movements of the hub on the shaft away from and back toward said stop means to adjust the blades to different speed positions, a counterforce spring on the shaft and acting on the hub against the wind forces for yieldingly holding the hub in engagement with said stop means and resisting the sliding movements of the hub from normal position under increasing wind pressures and effecting sliding movements of the hub back to normal position under relatively reduced wind pressures whereby under the actions of the wind forces and the said shifting means and the counteracting forces of the spring said shifting means will be caused to automatically adjust the blades to different speed positions as and when the wind forces vary, the ratio of adjustment of the blades under such counteracting forces and operation of the shifting means being such as to produce an automatic speed governing action to drive the shaft at a substantially constant speed regardless of the intensities of the wind forces acting on the blades, and an electrical device controlled by the shaft and responsive thereto under certain conditions to automatically operate said shifting means to adjust the blades to an arbitrary speed position.

32. A wind-driven propeller comprising a non-sliding rotary shaft, a hub surrounding the shaft and slidably adjustable thereon rearwardly from and backwardly to a normal starting position, rotatably adjustable blades carried by the hub, the blades being adjustable through sliding movements of the hub on the shaft in one direction from a said normal starting position under progressive wind pressures acting thereon to reduce the propeller speed, and said blades being adjustable through reverse sliding movements of the hub on the shaft back toward starting position under ensuing relatively reduced wind forces acting thereon to increase the propeller speed, a driving connection between the blades and shaft for rotating the shaft responsive to wind forces acting on the blades, stop means on the shaft for limiting the forward movement of the hub and against which the hub abuts in its starting position, a counterforce spring arranged on the shaft and acting on the hub against the wind forces for normally holding the hub in starting position against said stop means and yieldingly resisting the sliding movements of the hub from starting position and effecting sliding movements of the hub back to starting position under the relatively reduced wind forces, blade shifting means supported by the shaft and coupled to the blades for action thereon in the sliding movements of the hub under the wind forces and counteracting force of the spring to adjust the blades to different speed positions and produce an automatic speed governing action to drive the shaft at a substantially constant speed regardless of the intensities of the wind forces acting on the blades, an electrical generator driven by the shaft and means connected to the blade shifting means and responsive to an action of the generator to cause said shifting means to adjust the blades to an arbitrary speed position.

CHARLES FUMAGALLI.

References Cited in the file of this patent

UNITED STATES PATENTS

| Number | Name | Date |
|---|---|---|
| 878,022 | Roper | Feb. 4, 1908 |
| 910,899 | Bowers | Jan. 26, 1909 |
| 1,792,241 | Ray | Feb. 10, 1931 |
| 1,952,800 | Havill | Mar. 27, 1934 |
| 1,980,249 | Bates | Nov. 13, 1934 |
| 1,980,847 | Breguet | Nov. 13, 1934 |
| 1,982,170 | Lansing | Nov. 27, 1934 |
| 2,117,674 | Milner | May 17, 1938 |
| 2,179,962 | Scott | Nov. 14, 1939 |
| 2,278,247 | Cullin | Mar. 31, 1942 |
| 2,360,791 | Putnam | Oct. 17, 1944 |
| 2,360,792 | Putnam | Oct. 17, 1944 |
| 2,363,850 | Bany | Nov. 28, 1944 |
| 2,470,797 | Thomas | May 24, 1949 |
| 2,494,209 | Sikorsky | Jan. 10, 1950 |
| 2,547,636 | Fumagalli | Apr. 3, 1951 |
| 2,583,369 | Fumagalli | Jan. 22, 1952 |

FOREIGN PATENTS

| Number | Country | Date |
|---|---|---|
| 512,057 | Great Britain | Aug. 29, 1939 |
| 791,526 | France | Sept. 30, 1935 |
| 878,544 | France | Oct. 19, 1942 |